Patented Aug. 31, 1943

2,328,265

UNITED STATES PATENT OFFICE 2,328,265

PROCESS OF TREATING FRUIT

Louis F. Ducker and George A. Little, Orlando, Fla., assignors to Charles H. C. Van Pelt, Amberley Village, Hamilton County, Ohio No Drawing. Application April 14, 1941, Serial No. 388,492

3 Claims. (Cl. 99—156)

The invention relates to the treatment of fresh whole fruit, and more particularly citrus fruit, such as oranges and grapefruit, preliminary to the extraction of the juices for packaging and preserving, to yield a juice product possessing its natural flavor, bouquet, and vitamin content, adaptable without deterioration and spoil, to be held in package for a long period.

In the explanation of the process, reference will be directed to oranges for a given example of citrus fruit, as orange juice presents an important commercial field for the practice of the invention, although its utility is not necessarily confined to such particular type of fruit, nor to citrus fruits alone.

Numerous attempts heretofore have been made to package fresh fruit juices, such as orange or other citrus juices, in some manner to preserve the same for substantial periods, and to retain palatability, flavor, and characteristics possessed in juices freshly extracted from the fruit.

Fruit juices are readily susceptible to the action of yeast, bacteria, and other micro-organisms, which result in fermentation, decomposition, and other changes in the juices, harmfully effecting their natural flavor, and preventing the keeping of the juices in their natural condition for any length of time after extraction from the fruit. Many prior procedures relate to the treatment or processing of the juice to neutralize the bacteria and other micro-organisms present, as by sterilization, pasteurization, or heat-treatment, which, however, results in giving the product a perceptible cooked taste. In addition, the use of chemical preservatives in order to prevent or inhibit the action of yeast and bacteria have been resorted to, which, however, adversely affect the flavor of the juice and therefore do not favor competitively to the extraction of the juice from the fruit at the time and place of consumption.

The relative high vitamin content of certain fruit juices, as orange juice, is also an important factor to their consumption, and the methods heretofore employed tend to materially reduce the vitamin content of the juice as well as the flavor.

It has been recognized that deterioration of the natural orange juice flavor and food value takes place by the action of micro-organisms, principally yeast and mold, and various enzymes and bacteria; by oxidation of the essential oils, esters, aldehydes, and vitamins, and by the inclusion of alkaloid, glucosides, and excess oil, the latter three originating in the rag, seed or outer peel. The juice of sound citrus fruit in its natural enclosure is sterile. The conclusion, therefore, was reached that the major deleterious effects came from the surface and constituents of the peel, which are released or delivered into the juice during the process of extraction.

Some efforts have been made to first destroy or remove contaminating influences from the surface of the fruit, and then removing a portion of the rind and immediately adjacent underlying parts of the skin to eliminate a portion of the oil content of the peel in an attempt to control the amount of oil which will enter the juice in and during extraction. The intricacies involved for such accomplishments through mechanical means still does not eliminate the admixture of excessive amounts of constituents of the rind and rag into the juice. The excessive amount of essential oils of the peel in the juice, after being subjected to sterilizing or pasteurizing temperatures, causes the juice to take on a disagreeable taste and odor, especially after long standing in metal containers. By the present methods employed for juice extraction of citrus fruits, excessive amounts of essential oils are carried into the juice, and such extraction methods employing pressure to extract the juice break the oil cells of the peel and release the oil into the extracted juice.

A trend also followed to prevent contamination of the juice by essential oils and other constituents derived from the rind or peel without excessive removal of peel or loss of pulp, and for removing such contaminations from the juice with sufficient completeness to avoid the damaging effect upon the flavor and quality by what may be termed a pre-cooling method, is that of subjecting the whole fruit to a temperature approximately at freezing point before extracting the juice, and after extraction, subjecting the juice to a partial vacuum to form a supernatant layer containing the residual oils, resins, gums, and other troublesome contaminants and then rejecting the layer.

The present invention however makes possible the removal of substantially all of the troublesome oily constituents of the peel and other contaminations adhering or found on oranges, in a relatively simple and dependable manner before extraction of the juice, and without alteration or change to the commercial available apparatus for the extraction of the juice of oranges and other citrus fruits, or methods now employed in large volume production for canning and packaging, and by which the juice can be held for long periods in its natural flavor, aroma, and vitamin content.

It is an object of the invention to provide a method of treatment of the whole fruit prior to the juice extraction, to remove all deleterious matters present on the surface of the peel, or as a constituent of the peel to prevent the release thereof into the juice in the process of extraction, to avoid contamination of the juice and its damaging effect upon or impairment of the flavor and keeping quality, and which may be conveniently practiced for large volume production.

In the preferred practice, the whole fruit, initially, is subjected to or passed through a bath of water heated to a temperature of 140° F. to 180° F., containing in solution from 5% to 20% borax. The bath is for a short period of approximately one minute. The bath temperature and period of immersion or exposure of the whole fruit therein should not exceed or permit the transfer or penetration of heat perceptible beyond the peel or into the interior of the fruit.

The bath at the given temperature quickly destroys such micro-organisms as are found on oranges, rendering the surface of the fruit free from contaminating micro-organisms, and destroys the growth of putrefactive micro-organisms adhering to the surface without materially raising the temperature of the fruit as a whole. The thermal bath with a contained percentage of borax, aside from its antiseptic and sterilizing qualities, may be said to effect a spontaneous erruption of the sac in the citrus peel containing the oil, so that the contaminations and oil are released from the peel, and the oil is brought to the surface of the fruit from which it can be readily washed or otherwise adequately removed.

The heated water bath exterminates all yeast mold and other micro-organisms present or adhering on the skin, and the heat plus the antiseptic effects a sterilization and spontaneous erruption of the oil containing sac for its extraction and eradication from the peel or the surface thereof, and from which it can be more completely removed by a cold water spray and thermal air blast. The whole fruit in the thermal antiseptic bath is preferably kept in motion, rotatively, for uniform exposure of the peel and skin surface, and for continuity of operation and appropriate timing.

It has been discovered that there exists a definite relationship between the temperature of the water and the percentage of borax, that is, the ratio of temperature goes down with the raise in percentage of borax, or vice versa.

The given percentage range for the borax water solution is based upon the degree of temperature employed. However, for a more concrete example, a 12½% to an 18½% borax water solution at temperatures of from 150° F. to 170° F. is productive of very efficient results. A 12½% water borax solution is based upon one pound of borax to one gallon of water. The borax chemically is classified as a salt, the deca-hydrate of sodium tetraborate, $Na_2B_4O_7 \cdot 10H_2O$.

After the whole fruit leaves the sterilizing and peel oil erruption treatment, the whole fruit rotatively is then subjected to a high pressure cold water spray to wash off the loose foreign matter and peel oil from the skin. The high pressure cold water spray may be termed as a cleansing or rinsing operation, in which the water may be obtained from a city water service connection, or water obtained from a well available at a canning plant may be satisfactorily used; and the pressure of the spray nozzle should not be less than sixty pounds for an efficient and speedy result, although the degree of pressure is merely given for a definite example and not as a limiting factor.

After the washing operation, the whole fruit is passed through a thermal drying zone or chamber. The drier may be standard form now used in commercial citrus packing houses for the drying of a water wax emulsion subsequent to polishing. The surface of the whole fruit is thoroughly dried by either a thermal air blast, or in a drying chamber. A thorough drying of the peel is important due to the fact that the citrus peel oil from the errupted cells is highly volatile, and thereby readily eliminated, or it is caused to assume a viscid condition to remain on the peel of the fruit and is not released therefrom to enter the juice via the extraction process.

A standard drier, as conventionally employed for drying fruit before wax polishing, employing a temperature from 100° F. to 120° F. in conjunction with a blower providing high velocity air currents for rapid circulation and the elimination of water or moisture saturated air from the drier, is contemplated herein. It, however, is feasible and may be even preferable that the whole fruit be permitted to undergo a slower drying method, as storing in a well ventilated storage bin, from which the whole fruit is fed to the juice extracting machines and held therein for a period of 10 to 24 hours prior to the extraction of the juice. This can be practiced with equal results as the more rapid drying method, and at possibly a reduction in the cost of operation.

From the time the whole fruit leaves the thermal antiseptic bath until it reaches the stage for fruit extraction, the peel oil which does not escape by volatilization becomes a very heavy sticky substance, clinging in a nearly dry form to the orange or citrus peel, and to which it will adhere under the juice extracting pressure. The method hereinbefore described is susceptible for the production of an orange or citrus fruit juice, free from developing a rancidity resulting from the presence therein of peel oil, and therefore results in the production of a product of finer flavor and lastingly stable.

As the flavor of citrus juices is greatly dependent upon the aroma or bouquet produced by certain parts of the peel oil, and as by the foregoing described process a large percentage of this oil is removed, it is desirable in order to enhance the flavor to return these certain elements to the juice. This is preferably accomplished by adding an emulsified citrus oil, free from all terpenes which create rancidity in certain controlled amounts, thereby enhancing the flavor of the juice, and preventing any development of rancidity or unpalatable taste which is so commonly found in juices containing the raw citrus peel oil. This latter phase, however, insofar as it may relate to the production of an emulsified citrus oil is separate and apart from the present invention, so that its production will not be described in detail herein.

Having described our invention, we claim:

1. The method of preparing fruit juices, which comprises, subjecting the whole fruit to a 12½% to an 18½% borax water solution, having a temperature of from 150° F. to 170° F. for a period at which the heat will not penetrate to the interior of the fruit, water wash spraying the whole fruit with cold water, and drying the peel surface of the fruit prior to an extraction of the juice.

2. The method of treating fruit prior to juice extraction which consists in subjecting the whole fruit to a water bath having a temperature maintained between 150° F. and 170° F., and containing dissolved therein between 12½% to 18½% of borax for liberation and congealment of the oil in the peel of the fruit within a period insufficient for heat penetration to the interior of the fruit deleterious to the juice; then fresh water washing the fruit and allowing the outer surface to dry before extraction of the juice.

3. The method of treating fruit prior to juice extraction which consists in subjecting the whole fruit to a water bath having a temperature maintained between 150° F. and 170° F., and containing dissolved therein between 12½ and 18½ percent of borax effective for liberation and congealment of the oil in the peel of the fruit within a period insufficient for heat penetration to the interior of the fruit deleterious to the juice, then rinsing and drying the surface of the fruit.

LOUIS F. DUCKER.
GEORGE A. LITTLE.